United States Patent
Bhavthankar et al.

(10) Patent No.: US 11,519,608 B2
(45) Date of Patent: Dec. 6, 2022

(54) EMBOSSED FEATURE FOR COOKTOP ASSEMBLY

(71) Applicant: WHIRLPOOL CORPORATION, Benton Harbor, MI (US)

(72) Inventors: Vinit Vijay Bhavthankar, Maharashtra (IN); Abhay Babasaheb Khutwad, Maharashtra (IN); Francesca Partegiani, Varese (IT); Leonardo Poma, Milan (IT)

(73) Assignee: Whirlpool Corporation, Benton Harbor, MI (US)

( * ) Notice: Subject to any disclaimer, the term of this patent is extended or adjusted under 35 U.S.C. 154(b) by 586 days.

(21) Appl. No.: 16/566,527

(22) Filed: Sep. 10, 2019

(65) Prior Publication Data

US 2021/0071873 A1 Mar. 11, 2021

(51) Int. Cl.
*F24C 7/06* (2006.01)
*F24C 15/10* (2006.01)
*H05B 3/68* (2006.01)

(52) U.S. Cl.
CPC ............ *F24C 7/062* (2013.01); *F24C 15/107* (2013.01); *F24C 15/108* (2013.01); *H05B 3/68* (2013.01); *H05B 2203/005* (2013.01); *H05B 2203/014* (2013.01)

(58) Field of Classification Search
CPC .... F24C 15/102; F24C 15/107; F24C 15/108; F24C 7/062; F24C 7/067; H05B 3/68; H05B 6/1245; H05B 2203/005; H05B 2203/014; Y02B 40/00
See application file for complete search history.

(56) References Cited

U.S. PATENT DOCUMENTS

| | | | |
|---|---|---|---|
| 2,548,183 A * | 4/1951 | Walton | H05B 3/76 219/454.12 |
| 3,845,273 A | 10/1974 | Hurko | |
| 4,348,571 A | 9/1982 | Dills | |
| 5,847,364 A | 12/1998 | White et al. | |
| 7,087,866 B2 | 8/2006 | de Los Toyos et al. | |
| 8,536,489 B2 | 9/2013 | Martin et al. | |

(Continued)

FOREIGN PATENT DOCUMENTS

| | | |
|---|---|---|
| CN | 101825300 | 9/2010 |
| CN | 106642233 | 5/2017 |

(Continued)

*Primary Examiner* — Joel M Attey
*Assistant Examiner* — Bryan M Badalamenti
(74) *Attorney, Agent, or Firm* — Price Heneveld LLP

(57) ABSTRACT

A cooktop assembly includes a burner box and a controller disposed on the burner box. A mounting panel is coupled to the burner box over the controller. The mounting panel defines a plurality of embossed features. Each of the plurality of embossed features extends vertically upward from discrete portions of the mounting panel. A plurality of coil assemblies includes individual coil assemblies. Each of the individual coil assemblies includes a coil disposed on a coil plate that defines more than one aperture. Each of the individual embossed features extends through an aperture of the more than one aperture defined by one of the coil plates when the individual coil assemblies are disposed on the mounting panel. A cooktop is disposed over the plurality of coil assemblies and coupled to the burner box.

17 Claims, 8 Drawing Sheets

(56) References Cited

U.S. PATENT DOCUMENTS 10,194,492 B2    1/2019   Matulla et al.
2019/0113238 A1*   4/2019   Gomez ................ F24C 15/105

FOREIGN PATENT DOCUMENTS

| DE | 102013211300 | | 12/2014 |
|----|--------------|----|---------|
| EP | 3428542 | A1 * | 1/2019 |
| JP | H09266062 | | 10/1997 |
| WO | 20052968 | A1 | 9/2000 |

* cited by examiner ically,
EMBOSSED FEATURE FOR COOKTOP ASSEMBLY

BACKGROUND OF THE DISCLOSURE

The present disclosure generally relates to an embossed feature, and more specifically, to an embossed feature for a cooktop assembly.

SUMMARY OF THE DISCLOSURE

According to one aspect of the present disclosure, a cooktop assembly includes a burner box and a controller disposed on the burner box. A mounting panel is coupled to the burner box over the controller. The mounting panel defines a plurality of embossed features. Each of the plurality of embossed features extends vertically upward from discrete portions of the mounting panel. A plurality of coil assemblies includes individual coil assemblies. Each of the individual coil assemblies includes a coil disposed on a coil plate that defines more than one aperture. Each of the plurality of embossed features extends through an aperture of the more than one aperture defined by one of the coil plates when the individual coil assemblies are disposed on the mounting panel. A cooktop is disposed over the plurality of coil assemblies and coupled to the burner box.

According to another aspect of the present disclosure, a cooktop assembly includes a burner box and a controller disposed on the burner box, and a plurality of coil assemblies. Each of the individual coil assemblies includes a coil disposed on a coil plate. The coil plate defines an aperture. A mounting panel defines a plurality of embossed features. The plurality of embossed features includes individual embossed features extending vertically upward from a support surface of the mounting panel. The individual embossed features are arranged in more than one alignment set across the mounting panel that correspond with each of the individual coil assemblies. A cooktop is disposed over the more than one coil assembly and coupled to the burner box.

According to yet another aspect of the present disclosure, a method of assembling a cooktop assembly includes providing a burner box and coupling a mounting panel to the burner box. The mounting panel defines a plurality of embossed features extending vertically upward from the mounting panel. A plurality of coil assemblies includes coils disposed on coil plates that define apertures. Each individual coil assembly of the plurality of coil assemblies is aligned with the plurality of embossed features. Each of the individual coil assemblies of the plurality of coil assemblies are positioned on the mounting panel. Individual embossed features of the plurality of embossed features extend through the apertures defined by each of the individual coil assemblies. A cooktop is coupled to the burner box over the plurality of coil assemblies.

These and other features, advantages, and objects of the present disclosure will be further understood and appreciated by those skilled in the art by reference to the following specification, claims, and appended drawings.

Figure 1:
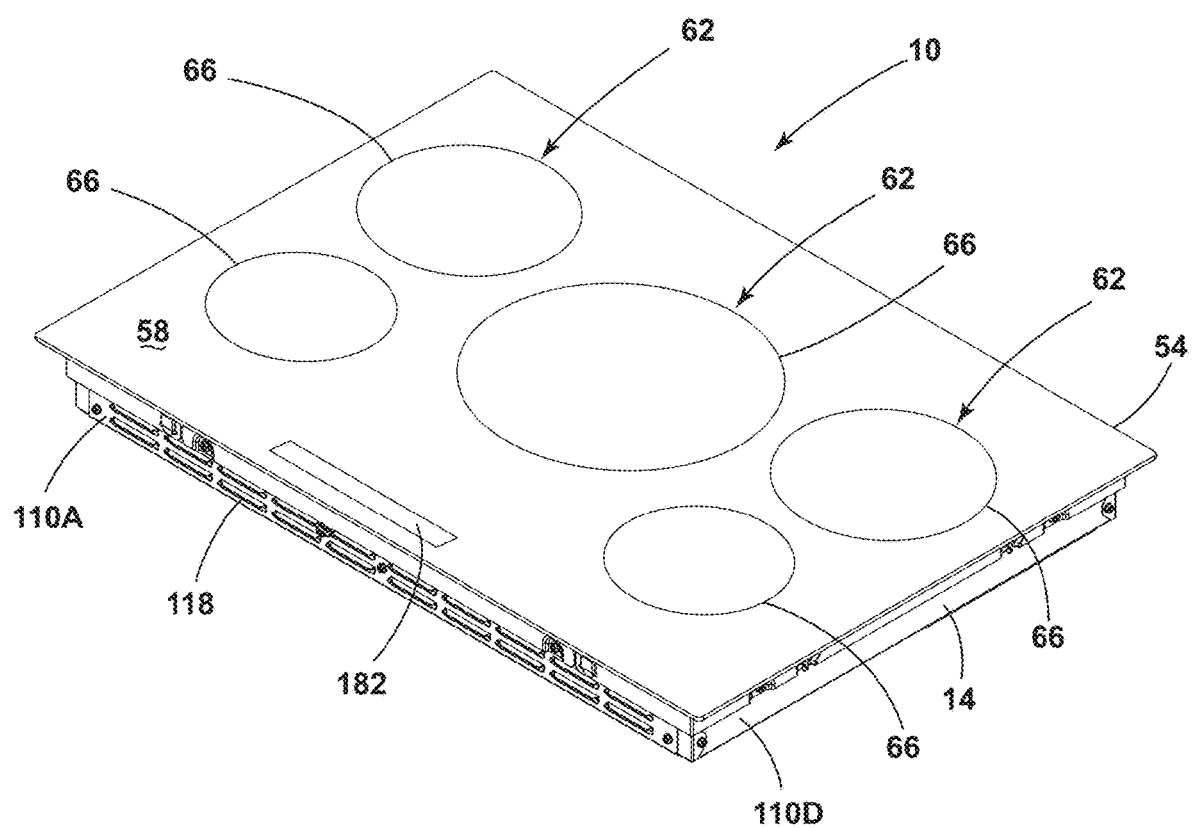
FIG. 1 is a top perspective view of a cooktop assembly, according to the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to an embossed feature for a cooktop assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-6, reference numeral 10 generally designates a cooktop assembly that includes a burner box 14 and a controller 18 disposed on the burner box 14. A mounting panel 22 may be coupled to the burner box 14 over the controller 18. The mounting panel 22 may define a plurality of embossed features 26 that include individual embossed features 30 that extend vertically upward from discrete portions of the mounting panel 22. A plurality of coil assemblies 34 includes individual coil assemblies 38. Each of the individual coil assemblies 38 includes a coil 42 disposed on a coil plate 46 that defines an aperture 50. The embossed features 30 of the plurality of embossed features 26 extend through the aperture 50 defined by one of the coil plates 46 when the individual coil assemblies 38 are disposed on the mounting panel 22. A cooktop 54 may be disposed over the plurality of coil assemblies 34 and is coupled to the burner box 14.

Referring to FIG. 1, the cooktop assembly 10 may include the cooktop 54 coupled to the burner box 14. The cooktop 54 may include a cooking surface 58 that has a plurality of heating zones 62 designated to a user by indicators 66. The indicators 66 may provide a visual representation of the location of the heating zones 62 on the cooktop 54. The cooktop assembly 10 may be disposed on a cooking appliance such as, for example, a single oven, a double oven, or any other cooking appliances. Additionally or alternatively, the cooktop assembly 10 may be disposed on a countertop. In such examples, the cooktop 54 may be flush with the surrounding countertop and the burner box 14 may be disposed below the countertop. This configuration may be advantageous for providing a cooktop that forms a continuous surface with the surrounding countertop.

Figure 2:
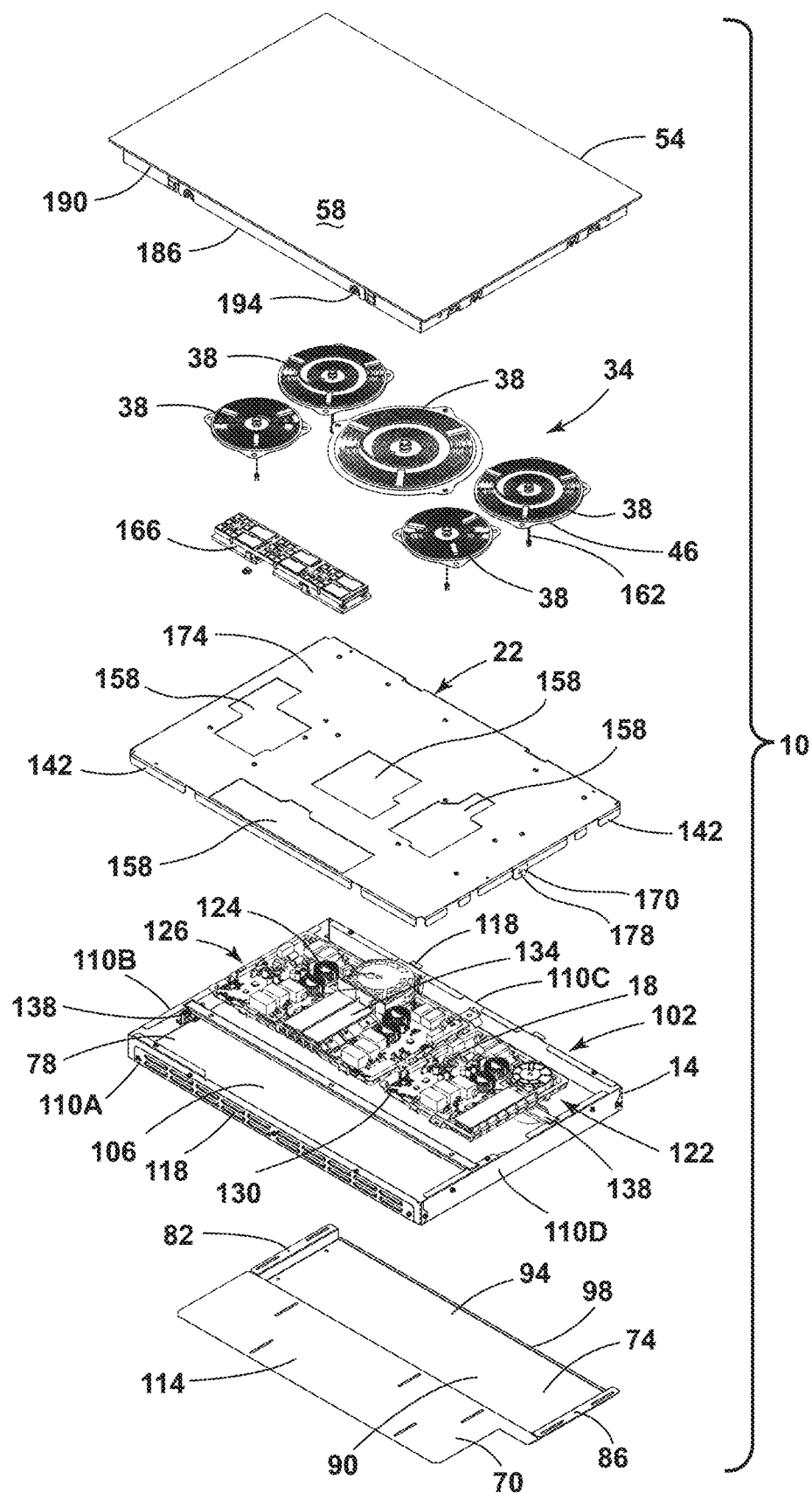
FIG. 2 is an exploded view of the cooktop assembly of FIG. 1.

Referring to FIG. 2, the cooktop assembly 10 may include a duct 70 that defines an airflow passage 74. The duct 70 may be coupled to a bottom wall 78 of the burner box 14. The duct 70 may provide for airflow beneath and/or along the bottom wall 78 of the burner box 14. Additionally or alternatively, the duct 70 may define varying depths relative to the bottom wall 78 of the burner box 14. In this way, the duct 70 may direct the air to selected locations of the burner box 14 and/or out of the cooktop assembly 10. The duct 70 may have sides 82, 86 spaced-apart and coupled to one another by a lower surface 90. The lower surface 90 and the sides 82, 86 may define at least a portion of the airflow passage 74. In various examples, the lower surface 90 and the sides 82, 86 are disposed in a rear portion 94 of the cooktop assembly 10 and may form an inlet 98 for the air to flow into and/or out of the airflow passage 74.

The burner box 14 may be coupled to the duct 70. In various aspects, the burner box 14 may be mechanically fastened to the duct 70. The burner box 14 may include the bottom wall 78 and a plurality of walls 102 that extend vertically upward from the bottom wall 78 to define an inner cavity 106. The plurality of walls 102 may include individual walls 110A-110D to substantially enclose the inner cavity 106. According to various aspects, the front wall 110A is disposed in a front portion 114 of the cooktop assembly 10 and may define slots 118. The front wall 110A may define a single slot 118 or a plurality of slots 118. The slots 118 may be in fluid communication with the inlet 98 defined by the duct 70. In such examples, the airflow passage 74 may extend between the inlet 98 and the slots 118 to provide ventilation to the burner box 14. Further, the airflow passage 74 may extend through the inner cavity 106 of the burner box 14.

Referring still to FIG. 2, an electrical assembly 122 may be disposed on the burner box 14 within the inner cavity 106. The electrical assembly 122 may include the controller 18 configured to selectively activate the individual coil assemblies 38. The controller 18 may include a processor and a memory. The memory may include instructions executable by the processor. In various examples, the electrical assembly 122 may correspond to an automatic control system configured to activate one or more of the coils 42 of the individual coil assemblies 38 in response to an input or a user selection. According to various aspects, a plurality of electrical components 126 may be included in the electrical assembly 122 and mounted within the burner box 14. A main circuit board 130 may be included in the electrical assembly 122. The circuit board 130 may be, for example, one or more circuits, which may be flexible or rigid circuits. Additionally or alternatively, the circuit board 130 may be a printed circuit board. A heatsink 134 may be coupled to the circuit board 130 and cooled by a fan 124 that is coupled to the burner box 14 and adjacent to the slots 118 defined by the rear wall 110C, which may be disposed proximate the rear portion 94 of the cooktop assembly 10. The heatsink 134 may be advantageous for cooling the electrical components 126, which may generate additional heat in conjunction with the individual coil assemblies 38.

In various examples, the electrical components 126 may be disposed on support members 138. The support members 138 may be a polymeric material, which may be advantageous for reducing heat transfer. The support members 138 may extend between the wall 1106 and the opposing wall 110D. Additionally or alternatively, the support members 138 may include metal materials and/or metal alloy materials, which may be advantageous for transferring heat away from the electrical components 126. Additionally or alternatively still, the support members 138 may be configured as rails for slidably engaging the electrical components 126 with the burner box 14.

The mounting panel 22 may be disposed over the electrical components 126, including the controller 18, and may be coupled to the burner box 14. In various examples, the mounting panel 22 may include coupling tabs 142 that extend vertically downward from a peripheral edge 146 of the mounting panel 22. The coupling tabs 142 may abut interior surfaces 150 of the walls 110A-110D of the burner box 14 when the mounting panel 22 is assembled with the burner box 14. This configuration may be advantageous for securing the mounting panel 22 and limiting movement of the mounting panel 22 relative to the burner box 14. The mounting panel 22 may also be mechanically fastened to the burner box 14.

According to various aspects, the mounting panel 22 may define openings 158. As illustrated in FIG. 2, the mounting panel 22 defines four openings 158. Each of the openings 158 may be any practicable shape and/or size without departing from the teachings herein. The openings 158 may provide a pathway for electrical connectors 162 to extend between the electrical components 126 and the individual coil assemblies 38. In this way, the openings 158 may be arranged to align with the individual coil assemblies 38. It is contemplated that the number of openings 158 defined by the mounting panel 22 may correspond with the number of individual coil assemblies 38, or alternatively, the mounting panel 22 may define fewer or more openings 158 than the number of individual coil assemblies 38. Further, at least one of the openings 158 defined by the mounting panel 22 may correspond with a human machine interface (HMI) 166. This configuration allows for the electrical connector 162 to extend between the HMI 166 and the electrical components 126 disposed within the burner box 14.

The mounting panel 22 may also include a conduit extension 170 that extends from proximate the peripheral edge 146 of the mounting panel 22. The conduit extension 170 may extend substantially perpendicular to the coupling tabs 142 and substantially parallel to a support surface 174 of the mounting panel 22. The conduit extension 170 may define a hole 178 for accommodating a power supply connector. The power supply connector may extend through the conduit extension 170 to the electrical components 126 disposed within the burner box 14. The power supply connector may provide power to the electrical components 126 from an external power source.

Referring still to FIG. 2, the individual coil assemblies 38 may be disposed on the support surface 174 of the mounting panel 22. The arrangement of the individual coil assemblies 38 may provide for the electrical connectors 162 from each of the individual coil assemblies 38 to extend through the openings 158 defined by the mounting panel 22 and couple to the electrical components 126. In various examples, the controller 18 may be operably coupled with the individual coil assemblies 38, such that the controller 18 may selectively activate each of the individual coil assemblies 38. As illustrated, the cooktop assembly 10 includes five individual coil assemblies 38. However, any practicable number of coil assemblies 38 may be included in the cooktop assembly 10 without departing from the teachings herein. Additionally or alternatively, the cooktop assembly 10, as illustrated in FIG. 2, includes the individual coil assemblies 38 of various sizes. It is contemplated that each of the individual coil assemblies 38 may be any practicable shape and/or size.

The HMI 166 may be configured to receive the input or selection from the user. The user may select an option and/or input a selection on the cooktop 54 via a user-interface 182 (FIG. 1). The user-interface 182 may include knobs, buttons, switches, touch-sensitive portions, etc. for allowing the user to make a selection related to the operation of the cooktop assembly 10. The HMI 166 may send a corresponding signal to the controller 18, which may then activate one or more of the individual coil assemblies 38 in response to the selection made by the user. In this way, the various electronic components 126 may be associated with the user-interface 182.

According to various aspects, the cooktop 54 may be disposed over the individual coil assemblies 38 and coupled to the mounting panel 22 and/or the burner box 14. The cooktop 54 may be mechanically fastened to the mounting panel 22 and/or the burner box 14. The cooktop 54 may include a bracket 186 that extends vertically downward from a bottom surface 190 of the cooktop 54. The cooktop 54 may define an orifice 194 to receive a fastener to couple the cooktop 54 to the mounting panel 22 and/or the burner box 14. Additionally or alternatively, the bracket 186 may define additional orifices 194 for ventilation of the cooktop assembly 10 proximate the individual coil assemblies 38 and/or the bottom surface 190 of the cooktop 54. In such examples, the orifices 194 may be in fluid communication with the inlet 98 and/or the slots 118 to further define the airflow passage 74 through the cooktop assembly 10 and provide a flow of cooling air for the electrical components 126 disposed within the burner box 14.

Referring now to FIGS. 1 and 2, the cooktop assembly 10 is illustrated as an induction cooktop assembly 10 (e.g., a hob). In such examples, the cooktop 54 may include glass, ceramic, glass-ceramic, and/or other similar materials. When assembled, the heating zones 62, as indicated by the indicators 66 on the cooking surface 58 of the cooktop 54, may correspond with the individual coil assemblies 38. Typically, the coils 42 of each of the individual coil assemblies 38 in induction cooktops 54 are electromagnetic. When activated, an electric current runs through the activated coils 42, which may generate a fluctuating magnetic field. Stated differently, an alternating current (e.g., an oscillating current) may be circulated through the coil 42 to produce an oscillating electromagnetic field. Once a cooking utensil, such as, for example, a pan or a pot, is disposed on the cooking surface 58 on one of the heating zones 62, the magnetic field may induce smaller electric currents in the material of the cooking utensil, which may be converted to heat. Stated differently, the controller 18 may send a current to each coil 42 to produce a magnetic field to heat the cooking utensil. Sensors may detect and maintain a temperature of the cooking utensil on the cooktop 54. While illustrated as an induction cooktop assembly 10, it is contemplated that the cooktop assembly 10 may be electric or another style of cooktop assembly 10 that includes the coils 42.

Figure 3:
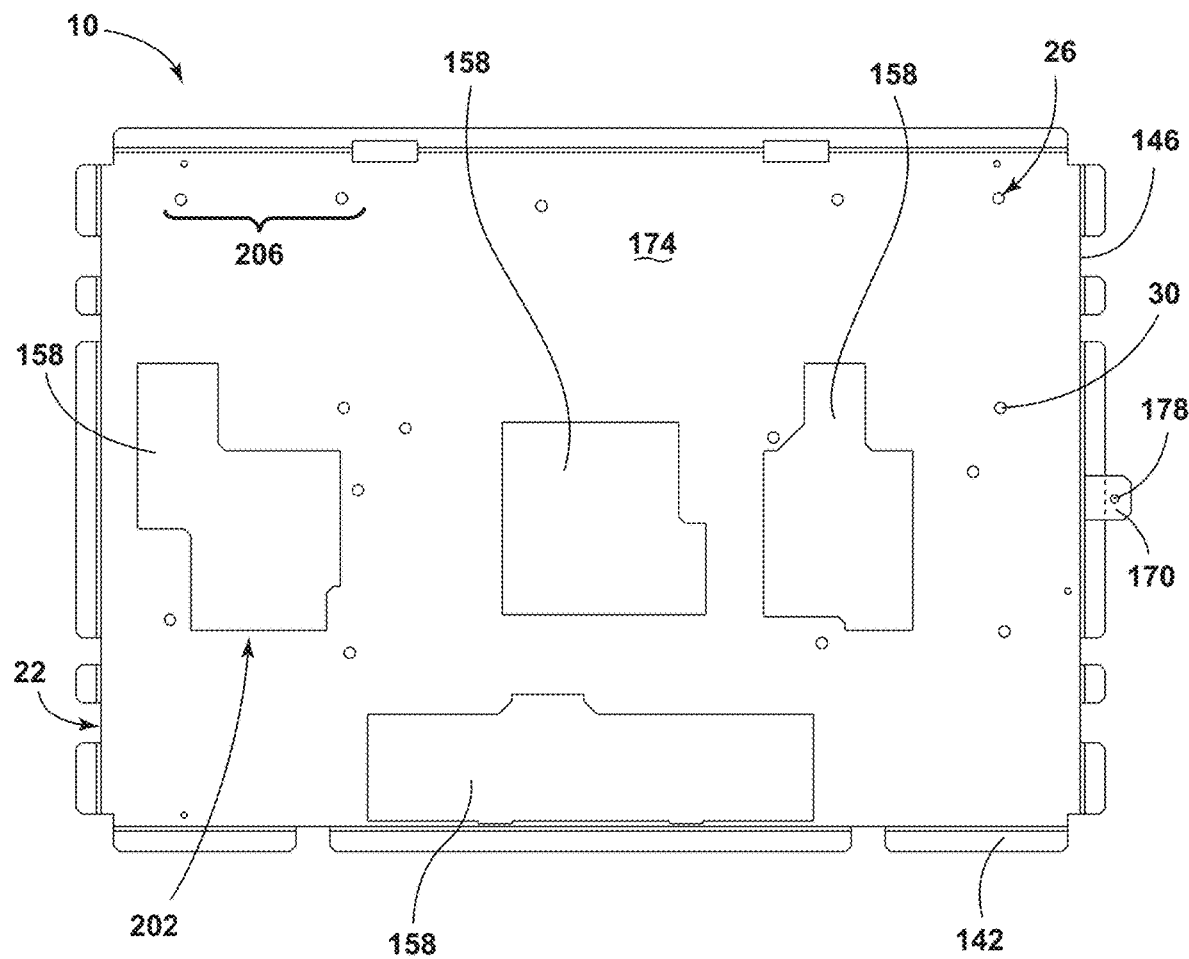
FIG. 3 is a top plan view of a mounting panel with a plurality of embossed features, according to the present disclosure.

Referring to FIG. 3, the cooktop assembly 10 includes the plurality of embossed features 26. The plurality of embossed features 26 includes the individual embossed features 30 defined in discrete portions of the mounting panel 22. The individual embossed features 30 may be arranged in a plurality of alignment sets 202, where each of the individual alignment set 206 of the plurality of alignment sets 202 corresponds with one of the individual coil assemblies 38. The individual alignment sets 206 may be disposed on various portions of the mounting panel 22, and/or may extend across the mounting panel 22, to provide for positioning of the individual coil assemblies 38 that correspond with the selected heating zones 62 (FIG. 1) of the cooktop assembly 10. Each of the individual alignment sets 206 may include three individual embossed features 30. However, it is contemplated that any number of the individual embossed features 30 may be included in a single alignment set 206. Further, the number of the individual alignment sets 206 within the plurality of alignment sets 202 may depend on the selected cooktop assembly 10 configuration and the number of the individual coil assemblies 38. Additionally or alternatively, the configuration of the individual embossed features 30 within each of the individual alignment sets 206 may vary based on the size and/or shape of each of the individual coil assemblies 38.

Figure 4:
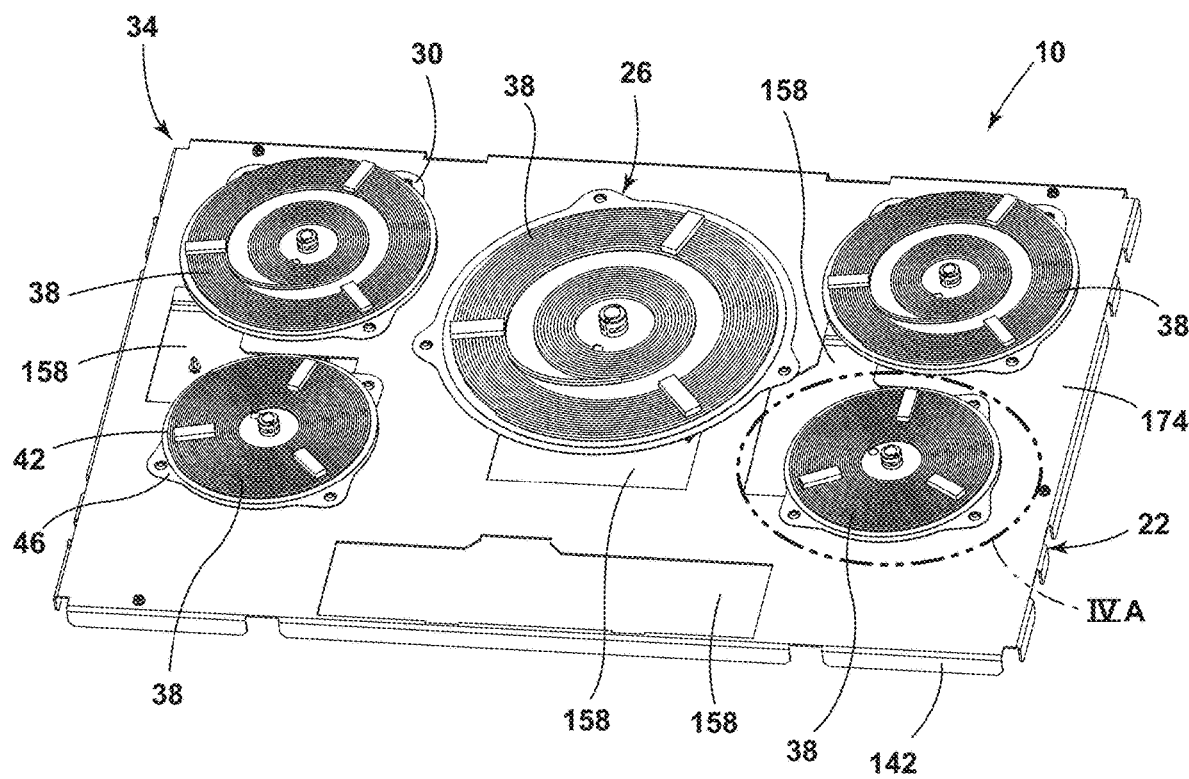
FIG. 4 is a top perspective view of a plurality of coil assemblies disposed on a mounting panel, according to the present disclosure.
Figure 4A:
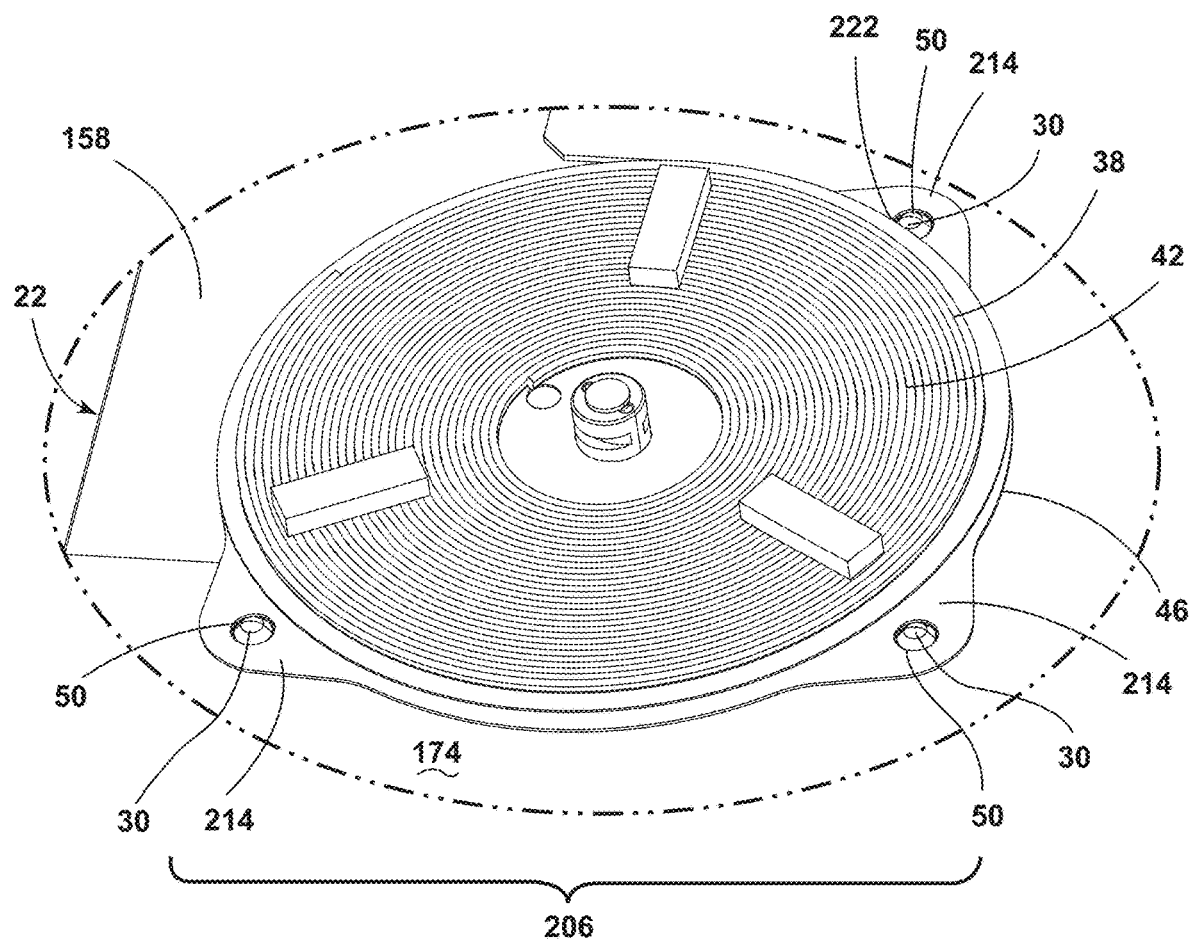
FIG. 4A is an enlarged view of one of the coil assemblies of the plurality of coil assemblies on the mounting panel of FIG. 4, taken at area IVA.

Referring to FIGS. 4 and 4A, the individual alignment sets 206 may correspond to selected sizes and/or shapes of the individual coil assemblies 38. This form of manufacture is typically referred to as poka-yoke, or mistake-proofing, which can minimize mistakes during the assembly of the structure with respect to the individual coil assemblies 38 on the mounting panel 22. Each of the individual coil assemblies 38 may include the coil 42 disposed on the coil plates 46. The coils 42 may be defined by a flat spiral of electrically conducted wire, which may generally produce a uniform heating effect. The coils 42 may be disposed on a substantial portion of an upper surface 210 of the coil plates 46. Each of the coil plates 46 may define a generally circular or oblong shape. Additionally or alternatively, each of the coil plates 46 may include a locating flange 214 that extends radially outward from the coil plate 46. The locating flange 214 may define a substantially parabolic shape extending from the coil plate 46. As illustrated in FIGS. 4 and 4A, each of the coil plates 46 includes three locating flanges 214, however, any practicable number of locating flanges 214 may be defined by the coil plates 46. In various examples, the number of locating flanges 214 corresponds with the number of the individual embossed features 30 in the corresponding individual alignment set 206.

Each of the locating flanges 214 may define the aperture 50. When assembled, the coil plates 46 may be positioned on the support surface 174 of the mounting panel 22. The individual embossed features 30 may extend upward from the support surface 174 of the mounting panel 22 and may extend through the apertures 50 of the coil plate 46. In this way, the locating flanges 214 may accommodate the individual embossed features 30 within the apertures 50. According to various aspects, one of the individual alignment sets 206 of the plurality of alignment sets 202 may correspond with each of the individual coil assemblies 38. The locating flanges 214 of each of the coil plates 46 may accommodate the corresponding individual alignment set 206 of the individual embossed features 30. Each of the individual alignment sets 206 of the individual embossed features 30 may be arranged to provide a poka-yoke assembly of the individual coil assemblies 38 on the support surface 174. In this way, each of the individual alignment sets 206 may correspond with the selected sizes and/or shapes of the individual coil assemblies 38. Additionally or alternatively, the individual alignment sets 206 may provide a selected configuration of the cooktop assembly 10. The indicators 66 on the cooking surface 58 (FIG. 1) may align with the heating zones 62 formed by each of the individual coil assemblies 38. The individual alignment sets 206 may retain each of the individual coil assemblies 38 in the selected configuration on the mounting panel 22.

Figure 5:
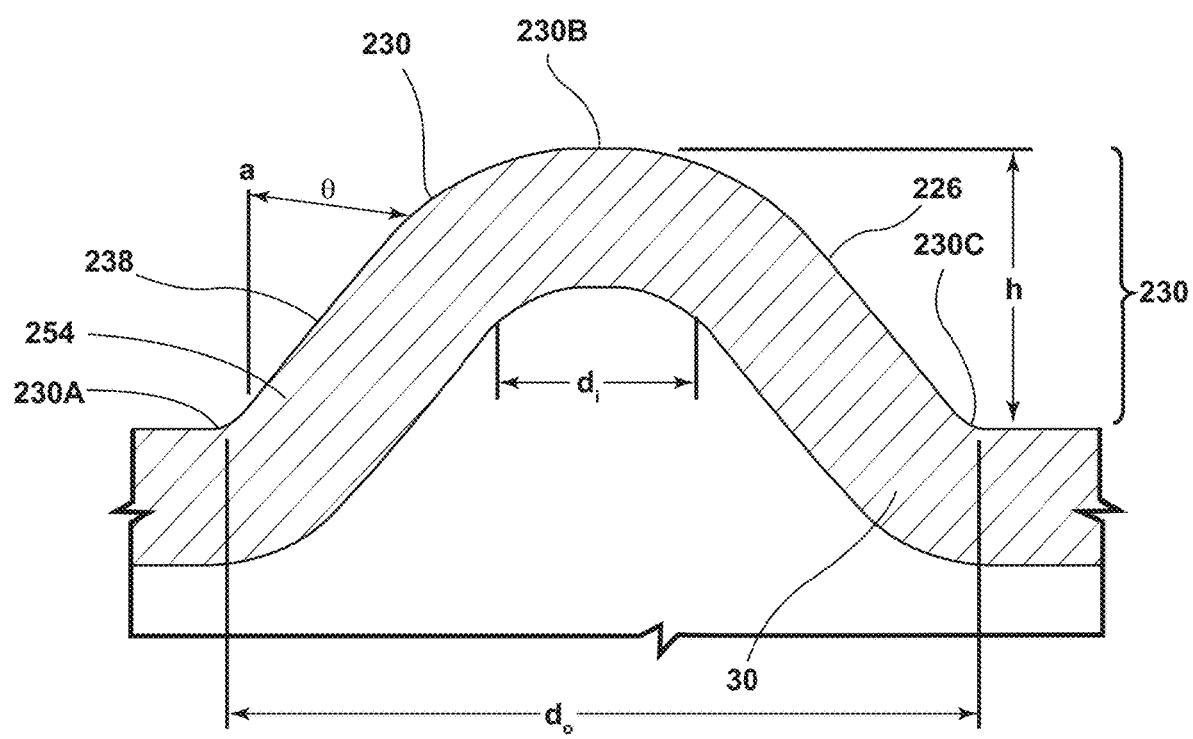
FIG. 5 is a cross-sectional view of an embossed feature of the mounting panel of FIG. 4A, taken along line V-V.

Referring to FIGS. 4A and 5, each of the individual embossed features 30 defines an outer diameter $d_o$. The outer diameter $d_o$ may correspond with a diameter of each of the apertures 50. In this way, an edge 222 of the locating flanges 214 that define the apertures 50 may abut an outer surface 226 of the corresponding individual embossed feature 30. This may be advantageous for retaining each of the individual coil assemblies 38 in the selected position on the mounting panel 22.

Referring to FIG. 5, the individual embossed feature 30, as illustrated, is an exemplary representation of the individual embossed features 30 of the plurality of embossed features 26 (FIG. 2). The individual embossed features 30 may extend vertically upward from the support surface 174 of the mounting panel 22. As illustrated, the support surface 174 and the individual embossed features 30 may define three inflection points 230A-230C. In this way, each of the individual embossed features 30 may define a substantially parabolic cross-sectional shape. Stated differently, each of the individual embossed features 30 may include a curved upper portion 242 and sloped sidewalls 238 that extend between the curved top portion 234 and the support surface 174 of the mounting panel 22. The sloped sidewalls 238 may be obliquely oriented relative to the support surface 174.

Additionally or alternatively, the inflection points 230B may be an apex of each of the individual embossed features 30. The apex of the individual embossed features 30 may be spaced-apart from the support surface 174 of the mounting panel 22 by the sidewalls 238. The apex of the curved top portion 234 may be positioned vertically above the support surface 174 of the mounting panel 22. Each of the individual embossed features 30 may have a height h defined between the support surface 174 of the mounting panel 22 and the apex (e.g., the inflection point 230B) of the curved top portion 234.

Figure 6:
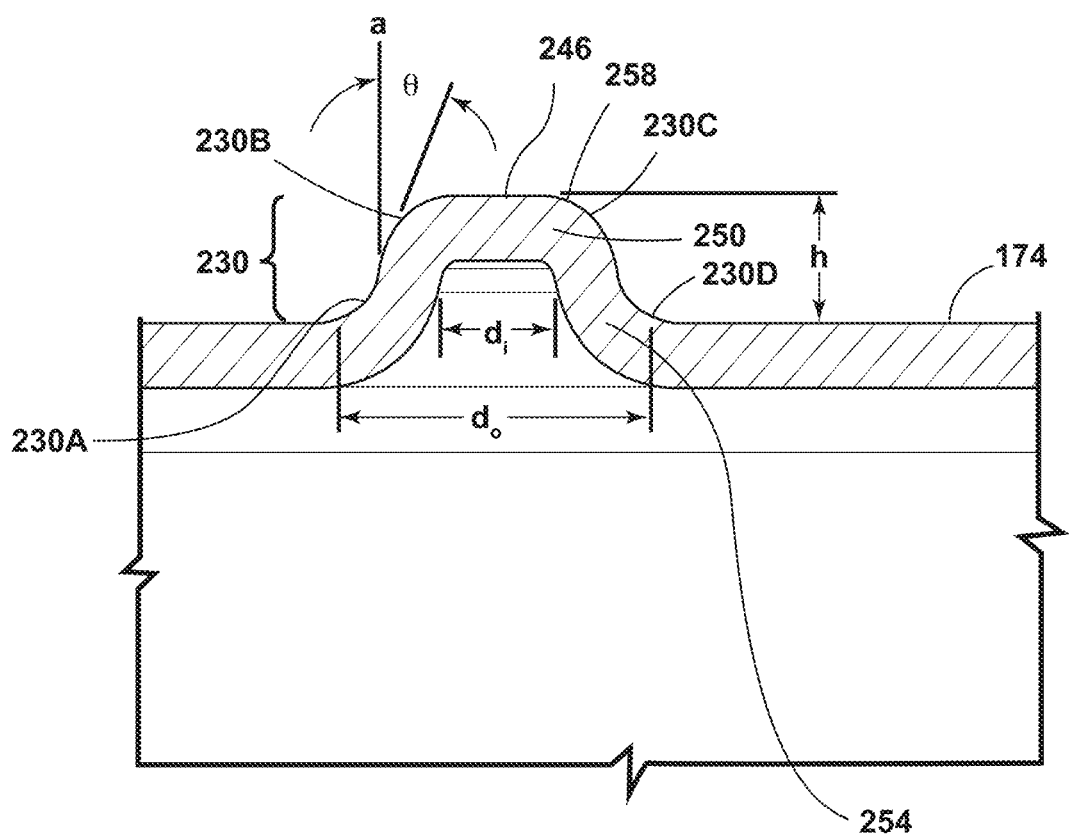
FIG. 6 is another cross-sectional view of an embossed feature of the mounting panel of FIG. 4A, taken along line V-V.

Referring to FIG. 6, the individual embossed feature 30, as illustrated in FIG. 6, is an additional and/or alternative exemplary representation of the individual embossed features 30 of the plurality of embossed features 26 (FIG. 2). The plurality of embossed features 26 may include either or both of the individual embossed features 30 illustrated in FIGS. 5 and 6. Referring again to FIG. 6, each of the individual embossed features 30 may include four inflection points 230A-230D. In this way, the upper portion 242 of each of the individual embossed features 30 may define a plateau 246. The plateau 246 may be spaced-apart from the support surface 174 of the mounting panel 22 and may be positioned vertically above the support surface 174. The sidewalls 238 of the individual embossed features 30 may extend at an angle between the support surface 174 of the mounting panel 22 and the plateau 246. Stated differently, the sidewall 238 may be obliquely oriented relative to the support surface 174 and the plateau 246.

The plateau 246 and the sidewall 238 may form a radiused edge 258 therebetween. In this way, the radiused edge 258 of the individual embossed features 30 may be rounded and/or curved. The radiused edge 258 of each of the individual embossed features 30 may be advantageous for positioning the individual embossed features 30 within the apertures 50 (FIG. 4A). Additionally or alternatively, each of the individual embossed features 30 may have a height h defined between the plateau 246 and the support surface 174 of the mounting panel 22.

Referring to FIGS. 4-6, the height h of each of the individual embossed features 30 may be defined between the upper portion 242 of the respective individual embossed feature 30 and the support surface 174 of the mounting panel 22. In various examples, each of the individual embossed features 30 may have the height h in a range of from about 0.5 mm to about 6 mm. Stated differently, the height h of each of the individual embossed features 30 may be in a range of from about 0.5 mm to about 6 mm relative to the support surface 174. In this way, each of the individual embossed features 30 may extend through the apertures 50 of the coil plates 46 and may not interfere with the coils 42 and/or the cooktop assembly 10.

Additionally or alternatively, each of the individual embossed features 30 may define the outer diameter $d_o$ and an inner diameter $d_i$. The outer diameter $d_o$ may be defined by the outer surface 226 of each of the individual embossed features 30 proximate the support surface 174 of the mounting panel 22. The outer diameter $d_o$ may be in a range of from about 4 mm to about 8 mm. The outer diameter $d_o$ may be less proximate to the upper portion 242 of the individual embossed features 30 than proximate a lower portion 254 of the individual embossed features 30. However, it is contemplated that the outer diameter $d_o$ may be lesser or greater depending on the diameter of the apertures 50. The inner diameter $d_i$ of the individual embossed features 30 may be less proximate the upper portion 242 of the embossed feature 30 than proximate the lower portion 254. The inner diameter $d_i$ may be defined by the sidewalls 238. Additionally or alternatively, the inner diameter $d_i$ may depend on, for example, the oblique orientation of the sidewalls 238, the substantially parabolic cross-sectional shape of the embossed feature 30, the curved top portion 234, and/or the plateau 246.

In various examples, as illustrated in FIGS. 5 and 6, each of the individual embossed features 30 may define a draft angle $\Theta$ defined between the outer surface 226 of the sidewall 238 of the embossed feature 30 and an axis a substantially perpendicular to the support surface 174 of the mounting panel 22. Stated differently, the individual embossed features 30 may be tapered, which may result in the draft angle $\Theta$. The draft angle $\Theta$ may be advantageous for increasing the efficiency of the manufacturing process. According to various aspects, each of the individual embossed features 30 may define the draft angle $\Theta$ in a range of from about 30° to about 50° between the outer surface 226 and the axis a substantially perpendicular to the support surface 174 of the mounting panel 22.

Figure 7:
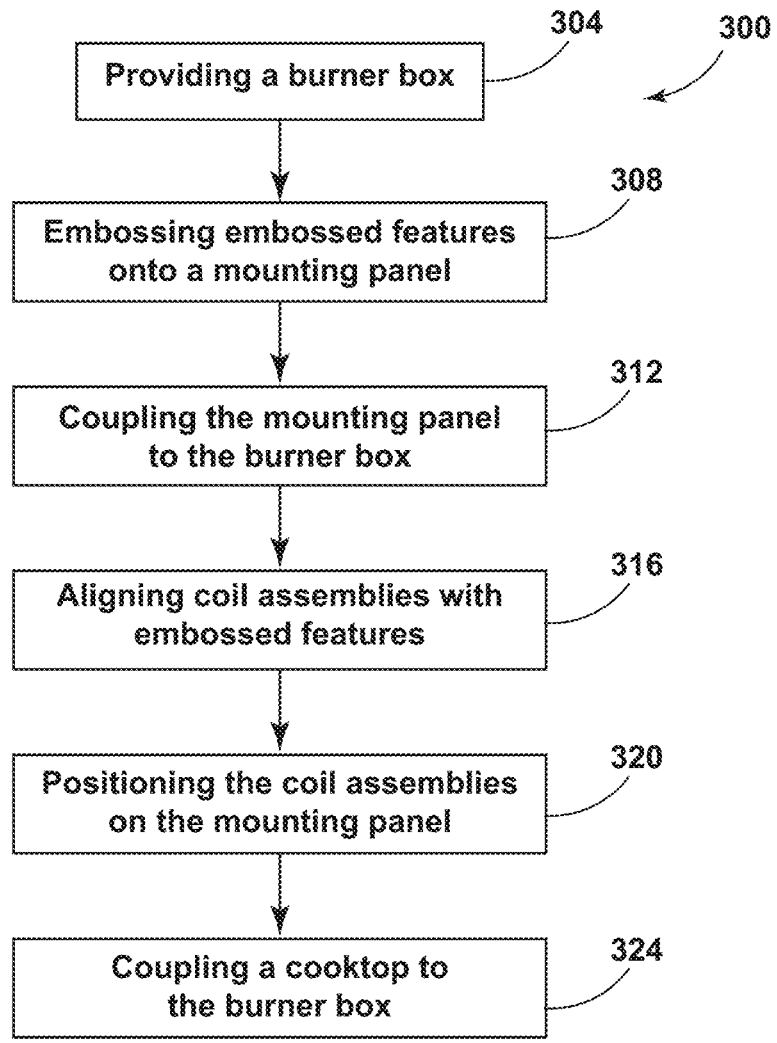
FIG. 7 is a flow diagram of a method of assembling a cooktop assembly, according to the present disclosure.

Referring to FIG. 7, and with further reference to FIGS. 1-6, a method 300 of assembling the cooktop assembly 10 may include a step 304 of providing the burner box 14. The step 304 may also include providing the electrical components 126, including the controller 18, disposed in the inner cavity 106 of the burner box 14. Additionally or alternatively, the duct 70 may also be provided and coupled to the burner box 14.

In step 308, the plurality of embossed features 26 may be embossed into discrete portions of the mounting panel 22. The embossing may be accomplished by an embossing tool or stylus to create a raised effect on an opposite side. In this way, each of the individual embossed features 30 may be carved, molded, or stamped onto a surface of the mounting panel 22, such that the individual embossed features 30 stand out in relief and are raised relative to the support surface 174 (e.g., an opposing surface). Additionally or alternatively, each of the individual embossed features 30 may be embossed into the mounting panel 22 to define the selected arrangement of the individual alignment sets 206.

In step 312, the mounting panel 22 that defines the plurality of embossed features 26 may be provided. The mounting panel 22 may be coupled to the burner box 14 over the electrical components 126. In various examples, the individual embossed features 30 may extend vertically upward from the support surface 174 of the mounting panel 22 away from the burner box 14.

The individual coil assemblies 38 may be aligned with the individual embossed features 30 of the plurality of embossed features 26 in step 316. According to various aspects, the individual coil assemblies 38 may be aligned with the corresponding individual alignment set 206. In this way, the selected configuration of the cooktop assembly 10 may be accomplished. Stated differently, each of the individual coil assemblies 38 may align with the indicators 66 on the cooking surface 58 of the cooktop 54.

Step 320 may include positioning each of the individual coil assemblies 38 of the plurality of coil assemblies 34 on the mounting panel 22. The step 320 may also include positioning the individual coil assemblies 38 on the support surface 174 of the mounting panel 22. Further, the individual coil assemblies 38 may be positioned such that the individual embossed features 30 extend through the apertures 50 defined by the coil plates 46. The step 320 may also include coupling the individual coil assemblies 38 to the electrical components 126.

Additionally or alternatively, the cooktop 54 may be coupled to the burner box 14 over the plurality of coil assemblies 34 in step 324. Further, the indicators 66 on the cooking surface 58 may be aligned with the individual coil assemblies 38 to provide for the discrete heating zones 62. The step 324 may also include coupling the HMI 166 to the user-interface 182 and the electrical components 126.

Use of the present disclosure may provide for a variety of advantages. For example, the individual alignment sets 206 of the individual embossed features 30 may provide for a poka-yoke configuration. The individual embossed features 30 may reduce manufacturing time and costs. Further, the mounting panel 22 with the individual embossed features 30 may reduce cycle time, such that the time on the assembly line during manufacturing may be reduced. Additionally, the individual embossed features 30 may improve the location of the individual coil assemblies 38. In this way, the individual coil assemblies 38 may have improved alignment relative to the indicators 66 on the cooking surface 58. Moreover, the individual embossed features 30 may improve an experience of the user by having the improved alignment of the coil assemblies 38. In addition, the individual embossed features 30 may improve the mounting of the individual coil assemblies 38 on the mounting panel 22. Additional benefits or advantages of using this device may also be realized and/or achieved.

According to at least one aspect, a cooktop assembly includes a burner box and a controller disposed on the burner box. A mounting panel is coupled to the burner box over the controller. The mounting panel defines a plurality of embossed features. Each of the plurality of embossed features extends vertically upward from discrete portions of the mounting panel. A plurality of coil assemblies includes individual coil assemblies. Each of the individual coil assemblies includes a coil disposed on a coil plate that defines more than one aperture. Each of the individual embossed features extends through an aperture of the more than one aperture defined by one of the coil plates when the individual coil assemblies are disposed on the mounting panel. A cooktop is disposed over the plurality of coil assemblies and coupled to the burner box.

According to yet another aspect, each of a plurality of embossed features defines a plateau.

According to another aspect, each of a plurality of embossed features defines a radiused edge between a plateau and a sidewall.

According to yet another aspect, a sidewall of each of a plurality of embossed features is obliquely oriented relative to a plateau and a support surface of a mounting panel.

According to another aspect, each of a plurality of embossed features includes a curved upper portion.

According to yet another aspect, each of a plurality of embossed features includes a sloped sidewall that extends between an upper portion of the individual embossed feature, respectively, and a support surface of a mounting panel.

According to another aspect, each of a plurality of embossed features defines a draft angle in a range of from about 30° to about 50° between an outer surface and an axis substantially perpendicular to a support surface of a mounting panel.

According to another aspect, each of a plurality of embossed features has a height in a range of about 0.5 mm to about 6 mm relative to a support surface of a mounting panel.

According to yet another aspect, each of a plurality of embossed features defines an inner diameter and an outer diameter. The outer diameter is in a range of from about 4 mm to about 8 mm.

According to another aspect, an outer diameter corresponds with a diameter of more than one aperture to position a plurality of coil assemblies on a support surface of a mounting panel.

According to yet another aspect, a cooktop assembly includes a burner box and a controller disposed on the burner box, and a plurality of coil assemblies. Each of the individual coil assemblies includes a coil disposed on a coil plate. The coil plate defines an aperture. A mounting panel defines a plurality of embossed features. The plurality of embossed features includes individual embossed features that extend vertically upward from a support surface of the mounting panel. The individual embossed features are arranged in more than one alignment set across the mounting panel that correspond with each of the individual coil assemblies. A cooktop is disposed over the more than one coil assembly and coupled to the burner box.

According to still another aspect, a coil plate includes at least one locating flange that extends outward to accommodate individual embossed features in an aperture defined therein.

According to another aspect, a coil plate includes three locating flanges that each define an aperture. An alignment set of individual embossed features corresponds with the apertures defined by the three locating flanges.

According to another aspect, each individual embossed feature and support surface of a mounting panel define at least three inflection points.

According to another aspect, each individual embossed feature and support surface of a mounting panel define four inflection points.

According to yet another aspect, each individual embossed feature defines a substantially parabolic cross-sectional shape.

According to another aspect, individual alignment sets of more than one alignment set correspond with individual coil assemblies.

According to still another aspect, a method of assembling a cooktop assembly includes providing a burner box and coupling a mounting panel to the burner box. The mounting panel defines a plurality of embossed features that extend vertically upward from the mounting panel. A plurality of coil assemblies have coils disposed on coil plates that define apertures. Each individual coil assembly of the plurality of coil assemblies is aligned with the plurality of embossed features. Each of the individual coil assemblies of the plurality of coil assemblies are positioned on the mounting panel. Individual embossed features of the plurality of embossed features extend through the apertures defined by each of the individual coil assemblies. A cooktop is coupled to the burner box over the plurality of coil assemblies.

According to still another aspect, a plurality of embossed features is embossed into a mounting panel and arranged in a plurality of alignment sets of embossed features.

According to another aspect, individual coil assemblies of a plurality of coil assemblies are aligned with corresponding alignment sets of individual embossed features.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A cooktop assembly, comprising:
   a burner box;
   a controller disposed on the burner box;
   a mounting panel coupled to the burner box over the controller, wherein the mounting panel defines a plurality of embossed features arranged across the mounting panel, and wherein each of the plurality of embossed features extends vertically upward from discrete portions of the mounting panel;
   a plurality of coil assemblies including individual coil assemblies, wherein each of the individual coil assemblies includes:
      a coil plate; and
      a coil disposed on the coil plate, wherein each coil plate has first and second locating flanges diametrically opposed from one another and a third locating flange disposed therebetween, wherein each locating flange defines an aperture, and wherein each individual embossed feature of the plurality of embossed features extends through one of the apertures defined by one of the coil plates when the individual coil assemblies are disposed on the mounting panel; and
   a cooktop disposed over the plurality of coil assemblies and coupled to the burner box.

2. The cooktop assembly of claim 1, wherein each of the plurality of embossed features defines a plateau.

3. The cooktop assembly of claim 2, wherein each of the plurality of embossed features defines a radiused edge between the plateau and a sidewall.

4. The cooktop assembly of claim 2, wherein a sidewall of each of the plurality of embossed features is obliquely oriented relative to the plateau and a support surface of the mounting panel.

5. The cooktop assembly of claim 1, wherein each of the plurality of embossed features includes a curved upper portion.

6. The cooktop assembly of claim 5, wherein each of the plurality of embossed features includes a sloped sidewall extending between the curved upper portion of each of the plurality of embossed features and a support surface of the mounting panel.

7. The cooktop assembly of claim 1, wherein each of the individual embossed features defines a draft angle in a range of from about 30° to about 50° between an outer surface and an axis substantially perpendicular to a support surface of the mounting panel.

8. The cooktop assembly of claim 1, wherein each of the plurality of embossed features has a height in a range of about 0.5 mm to about 6 mm relative to a support surface of the mounting panel.

9. The cooktop assembly of claim 1, wherein each of the plurality of embossed features defines an inner diameter and an outer diameter, and wherein the outer diameter is in a range of from about 4 mm to about 8 mm.

10. The cooktop assembly of claim 9, wherein the outer diameter corresponds with a diameter of the respective aperture to position the plurality of coil assemblies on a support surface of the mounting panel.

11. A cooktop assembly, comprising:
a burner box;
a controller disposed on the burner box;
a plurality of coil assemblies, wherein each of the individual coil assemblies includes a coil disposed on a coil plate, and wherein the coil plate has locating flanges that each define an aperture;
a mounting panel defining a plurality of embossed features, wherein the plurality of embossed features includes individual embossed features extending vertically upward from a support surface of the mounting panel, and wherein the individual embossed features are arranged in alignment sets across the mounting panel, each alignment set having the individual embossed features arranged to correspond with the apertures of the locating flanges of the respective individual coil assembly, and wherein the individual embossed features of each alignment set are positioned along a perimeter of the respective coil, wherein each coil plate includes three locating flanges extending outward to accommodate the individual embossed features in the aperture defined therein, and wherein two of the locating flanges are diametrically opposed from one another; and
a cooktop disposed over the plurality of coil assemblies and coupled to the burner box.

12. The cooktop assembly of claim 11, wherein each of the individual embossed features and the support surface of the mounting panel define at least three inflection points.

13. The cooktop assembly of claim 12, wherein each of the individual embossed features and the support surface of the mounting panel define four inflection points.

14. The cooktop assembly of claim 11, wherein each of the individual embossed features defines a substantially parabolic cross-sectional shape.

15. The cooktop assembly of claim 11, wherein each individual alignment set of the more than one alignment set correspond with the individual coil assemblies.

16. A method of assembling a cooktop assembly, comprising:
providing a burner box;
coupling a mounting panel defining a plurality of embossed features extending vertically upward from the mounting panel to the burner box;
providing a plurality of coil assemblies having coils disposed on coil plates defining apertures;
aligning each individual coil assembly of the plurality of coil assemblies with the plurality of embossed features;
positioning each of the individual coil assemblies of the plurality of coil assemblies on a support surface of the mounting panel, wherein individual embossed features of the plurality of embossed features extend through the apertures defined by each of the individual coil assemblies and abut edges of the respective coil plate defining the apertures, the individual embossed features positioned along a perimeter of the respective coil, wherein each of the coil plates includes three locating flanges extending outward to accommodate the individual embossed features in the aperture defined therein, and wherein two of the locating flanges are diametrically opposed from one another; and
coupling a cooktop to the burner box over the plurality of coil assemblies.

17. The method of claim 16, further comprising:
embossing the plurality of embossed features into the mounting panel and arranging the plurality of embossed features in a plurality of alignment sets.

* * * * *